(12) United States Patent
Jerger et al.

(10) Patent No.: US 10,920,878 B2
(45) Date of Patent: *Feb. 16, 2021

(54) SHIFT-BY-WIRE SELECTOR CONTROL SYSTEM FOR A MOTOR VEHICLE TRANSMISSION AND METHOD THEREFOR

(71) Applicant: Jaguar Land Rover Limited, Coventry (GB)

(72) Inventors: Rob Jerger, Southham (GB); Pete Stares, Coventry West Midlands (GB); Darren Vincent, Chepstow (GB); Hardev Mandair, Birmingham (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 83 days.

This patent is subject to a terminal disclaimer.

(21) Appl. No.: 16/162,357

(22) Filed: Oct. 16, 2018

(65) Prior Publication Data

US 2019/0049003 A1 Feb. 14, 2019

Related U.S. Application Data

(63) Continuation of application No. 15/412,788, filed on Jan. 23, 2017, now Pat. No. 10,125,865, which is a
(Continued)

(30) Foreign Application Priority Data

Aug. 23, 2007 (GB) .................................. 0716372.8

(51) Int. Cl.
*F16H 59/08* (2006.01)
*F16H 61/22* (2006.01)
(Continued)

(52) U.S. Cl.
CPC ............. *F16H 61/22* (2013.01); *B60K 37/06* (2013.01); *F16H 59/08* (2013.01); *F16H 59/54* (2013.01);
(Continued)

(58) Field of Classification Search
CPC ........... F16H 2059/081; F16H 61/0204; F16H 61/22; F16H 61/24; F16H 2061/1216; F16H 2061/1244; F16H 59/54
See application file for complete search history.

(56) References Cited

U.S. PATENT DOCUMENTS 5,372,050 A 12/1994 Shinki et al.
5,453,732 A 9/1995 Takano
(Continued)

FOREIGN PATENT DOCUMENTS

DE 10049307 A1 4/2002
DE 10227633 A1 1/2004
(Continued)

OTHER PUBLICATIONS

English abstract for EP-1750039.
(Continued)

*Primary Examiner* — Edwin A Young
(74) *Attorney, Agent, or Firm* — Reising Ethington P.C.

(57) ABSTRACT

A method for operating a multi-stable shift-by wire selector control system of a motor vehicle transmission. The multi-stable shift-by wire selector control system includes a multi-stable selector which is operable by the driver of the vehicle to select a respective one of the operating modes of the transmission, an arrangement of illuminated labels indicating the selector mode and an indexing mechanism for maintaining the immobilization of the selector in its different positions.

20 Claims, 4 Drawing Sheets

Related U.S. Application Data continuation of application No. 14/334,321, filed on Jul. 17, 2014, now Pat. No. 9,587,736, which is a continuation of application No. 14/132,975, filed on Dec. 18, 2013, now Pat. No. 8,818,656, which is a continuation of application No. 14/035,928, filed on Sep. 24, 2013, now abandoned, which is a continuation of application No. 12/197,560, filed on Aug. 25, 2008, now Pat. No. 8,548,696.

(51) Int. Cl.
    *B60K 37/06*     (2006.01)
    *F16H 61/24*     (2006.01)
    *F16H 63/42*     (2006.01)
    *F16H 61/68*     (2006.01)
    *F16H 61/02*     (2006.01)
    *F16H 59/54*     (2006.01)

(52) U.S. Cl.
    CPC ......... *F16H 61/0204* (2013.01); *F16H 61/24* (2013.01); *F16H 61/68* (2013.01); *F16H 63/42* (2013.01); *B60K 2370/126* (2019.05); *F16H 2059/081* (2013.01); *F16H 2061/223* (2013.01); *F16H 2063/423* (2013.01); *Y10T 74/2003* (2015.01)

(56) References Cited

U.S. PATENT DOCUMENTS

| | | |
|---|---|---|
| 6,732,847 B1 | 5/2004 | Wang |
| 7,441,474 B2 | 10/2008 | Kliemannel et al. |
| 8,548,696 B2 | 10/2013 | Jerger et al. |
| 8,818,656 B2 | 8/2014 | Jerger et al. |
| 9,587,736 B2 | 3/2017 | Jerger et al. |
| 10,125,865 B2 * | 11/2018 | Jerger .................. B60K 37/06 |
| 2002/0020236 A1 | 2/2002 | Onodera |
| 2002/0084149 A1 | 7/2002 | Heuver |
| 2002/0137597 A1 | 9/2002 | Genise et al. |
| 2003/0013571 A1 | 1/2003 | Tabata |
| 2003/0029261 A1 | 2/2003 | DeJonge |
| 2003/0087727 A1 | 5/2003 | Loibl |
| 2003/0195082 A1 | 10/2003 | Kalia |
| 2004/0226801 A1 | 11/2004 | De Jonge et al. |
| 2004/0248686 A1 | 12/2004 | Berger et al. |
| 2005/0028632 A1 | 2/2005 | Giefer et al. |
| 2005/0143220 A1 | 6/2005 | Berger et al. |
| 2006/0016287 A1 | 1/2006 | Grossman et al. |
| 2006/0037424 A1 | 2/2006 | Pickering et al. |
| 2006/0276300 A1 | 12/2006 | Kashiwagi et al. |
| 2006/0288812 A1 | 12/2006 | Okawa |
| 2014/0100747 A1 | 4/2014 | Jerger et al. |

FOREIGN PATENT DOCUMENTS

| | | |
|---|---|---|
| EP | 1750039 A1 | 2/2007 |
| JP | 61-084451 A | 4/1986 |
| JP | 04-365640 A | 12/1992 |

OTHER PUBLICATIONS

English abstract for JP04-365640.
English abstract for JP-61-084451.
Research Disclosure (33158) nr.331, Nov. 1991, Anonym "Brake/transmission shift alarm", p. 877.

* cited by examiner

SHIFT-BY-WIRE SELECTOR CONTROL SYSTEM FOR A MOTOR VEHICLE TRANSMISSION AND METHOD THEREFOR

CROSS-REFERENCES TO RELATED APPLICATIONS

This application is a continuation application of U.S. patent application Ser. No. 15/412,788, filed Jan. 23, 2017, which is a continuation of U.S. patent application Ser. No. 14/334,321, filed Jul. 17, 2014, now U.S. Pat. No. 9,587,736, issued Mar. 7, 2017. Ser. No. 14/334,321 is a continuation application of U.S. patent application Ser. No. 14/132,975, filed Dec. 18, 2013, now U.S. Pat. No. 8,818,656, issued Aug. 26, 2014, which is a continuation application of U.S. patent application Ser. No. 14/035,928, filed Sep. 24, 2013 (abandoned), which is a continuation application of U.S. application Ser. No. 12/197,560, filed Aug. 25, 2008, now U.S. Pat. No. 8,548,696, issued Oct. 1, 2013, which claims priority to United Kingdom Patent Application No. 0716372.8, filed Aug. 23, 2007. The contents of all of these applications are hereby incorporated by reference in their entirety.

BACKGROUND OF THE INVENTION

1. Field of the Invention

The present invention relates to a multi-stable shift-by wire selector control system of a motor vehicle transmission, more specifically an automatic or semi-automatic vehicle transmission and method therefor.

2. Background Art

A shift-by-wire selector having multi-stable positions, each operating a mode of the automatic transmission, i.e. Park, Reverse, Neutral, Drive. The selector may include sensor means for sensing the position of the selector and generating selector signals to a transmission control unit which transmits control signal to the vehicle transmission and an indexing mechanism for maintaining the selector in each of its multi-stable positions. The indexing means has a detent plate having notches for cooperation with a mechanical detent having a configurable force.

Although such a selector has been proven effective, it has been found that it is possible for the selector to be left between two positions, e.g. between a Park position and/or a Neutral position. When this happens, the selector might be able to be moved by a subsequent vibration, shock or even unintentionally by a person and engaged a drive mode (Drive, Reverse) of the automatic transmission even if the selector is left in Park position as the selector cannot be locked by a lock mechanism which can only be engaged when the selector is in a nominal Park position or Neutral position and thus might cause an unsafe vehicle condition.

SUMMARY OF THE INVENTION

According to the invention there is provided a system method for operating a multi-stable shift-by wire selector control system of a motor vehicle transmission, the vehicle having an engine and a foot brake pedal, the transmission having a number of operating modes, at least four of the operating modes being Park mode, Drive mode, Neutral mode and Reverse mode, the Park mode and the Neutral mode being so-called non drive mode and the other mode Reverse and Drive being so-called drive mode, a transmission control unit (TCU) which in use controls the ratio of the transmission, the system includes a multi-stable selector which is operable by the driver of the vehicle to select one of the respective operating modes of the transmission, the vehicle also has an electronic transmission selector (ETS) for sensing the selected mode position of the selector and sending a command to the TCU.

The system further includes an arrangement of illuminated labels (P, R, N, D) indicating the selector mode, an indexing mechanism for maintaining the immobilization of the selector in its different positions respectively P, R, N, and D and also enabling the driver to perceive the transition from one position to another and a warning device, the method comprising, when the selector has been monitored between two indexing position or intermediate position so called hysteresis range where no instruction command is sent to the TCU, the steps of (a) determining whether the selector has been moved from a non drive mode to a drive mode; (b) checking that the foot brake pedal is depressed when the selector is moved, and, if not, c) providing a warning signal to the warning device in order to inform the driver that the selector is not in an indexed position and that a drive mode maybe selected and an instruction command to the TCU so as to maintain the current gear mode and inhibit any gear change until the selector is detected to a new position.

The warning device is a luminous system, a vibration system or a sound making system or a combination. In an alternative the warning device forms part of the illuminated labels arranged in such a way that the warning signal sends a control signal to the illuminated labels in order to flash the illuminated label corresponding to the drive mode susceptible of being selected.

Preferably the method comprises further before the step b), the step of determining whether the magnitude of the motion of the selector is above a predetermined threshold speed value and if yes inhibiting the warning signal and maintaining of the current gear position of step c). The selector system is further provided with a lock device to lock the selector in its park mode position or neutral mode position, the locking device being disengageable when the foot brake pedal is detected depressed, the method comprises further to the step a) the step of providing an instruction command to the locking device to inhibit the control signal to lock the selector when the selector is monitored within the intermediate position between the Park mode and the Reverse mode, the Neutral mode and the Reverse mode or the Neutral Mode and the Drive mode.

DETAILED DESCRIPTION OF THE PREFERRED EMBODIMENT(S)

As required, detailed embodiments of the present invention are disclosed herein. However, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
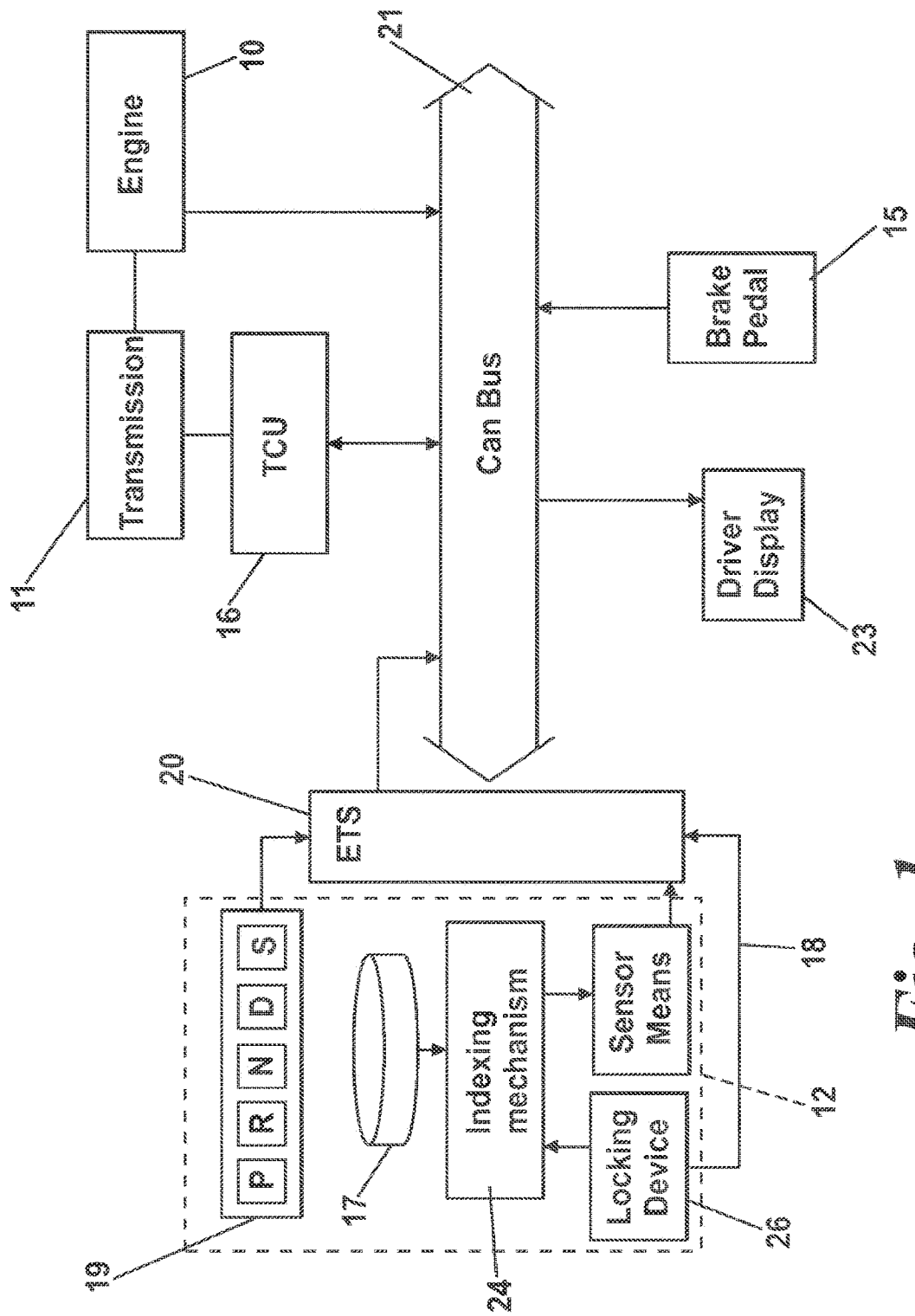
FIG. 1 is a schematic representation of the principal electrical subsystems of a motor vehicle provided with a multi-stable shift-by-wire control selector system in accordance with the present invention.

With reference now to the Figures, FIG. 1 illustrates an electrical architecture of a motor vehicle including an engine 10, an automatic gearbox or transmission 11 and a multi-stable selector system 12. The transmission 11 is controlled by a transmission control unit (TCU) 16 which includes sensors arranged to detect the position of the transmission. The TCU 16 is also electrically connected to an Electronic Transmission Selector (ETS) 20. The ETS 20 is electrically connected to the selector system 12 which is provided in the passenger compartment for enabling the selection of operating modes in the transmission, e.g. Park (P), Reverse (R), Neutral (N), Drive (D). It may be provided further operating modes such as a Sport (S) or a Manual mode.

Figure 2:
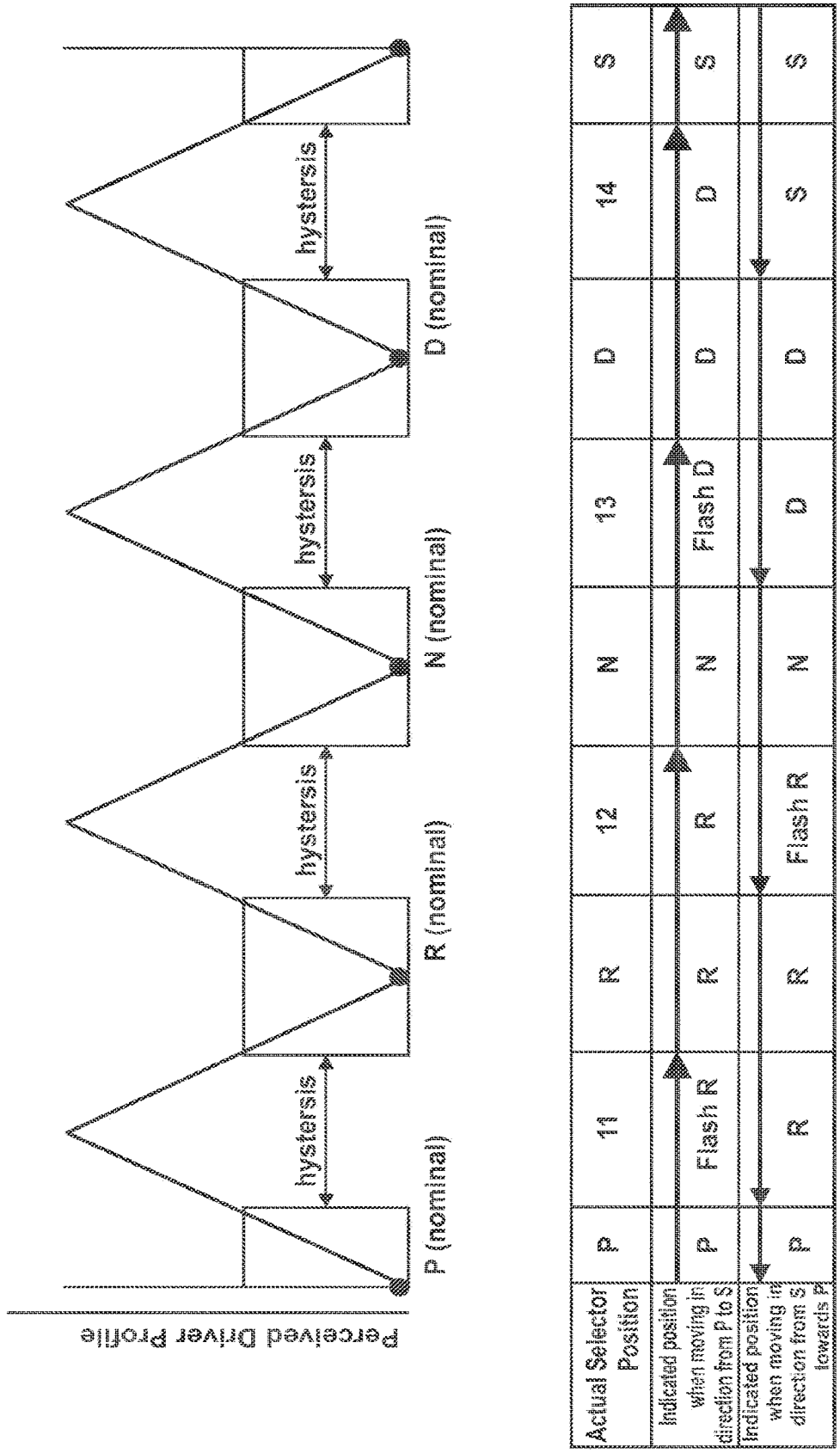
FIG. 2 is a graph illustrating the profile perceived by the driver when manipulating the selector in its different position as well as for each position the information displays to the driver depending on the direction of the motion of the selector monitored.

The selector system 12 comprises a selector, in this example a rotary selector 17 which can be grasped by the driver to select the operating mode and sensor means in the form of position sensors 18, for instance angular sensor, to detect the position of the rotary selector 17 as well as the direction and the magnitude of the motion of the selector and to transmit an input to the ETS 20 which transmit a command input to the TCU 16. The rotary selector 17 is associated with an arrangement of illuminated labels (P, R, N, D, S) 19 indicating the selected mode. The selector 17 further includes an indexing mechanism 24 for maintaining the immobilization of the selector in its different positions respectively P, R, N and D but also enabling the driver to perceive the transition from one position to another as illustrated in FIG. 2. In this example, the indexing mechanism 24 comprises a detent plate which is provided on its periphery with notches over a sector and these can be engaged successively by a spring-loaded detent member or detent pin when the detent plate rotates as explained more fully in GB2420833 for instance.

The selector system 12 further includes a locking device 26 controlled by the transmission control unit 16 via the ETS 20 for preventing movement of the selector 17 when the selector is in Park position and a brake pedal 15 has not been depressed. In this example, the locking device 26 (not shown) is a solenoid actuator engageable with a slot arranged within the detent plate.

Conventionally the TCU 16 is also connected to a driver display 23 in order to indicate the currently engaged gear of the transmission. As can best be seen in FIG. 2, the indexing mechanism 26 is conformed in such a way to provide a hysteresis band or dead-band between each position, i.e. a difference between the start point of a shift command to the transmission to the next start point of a next shift command forming hence an area where no signal is sent to the TCU to shift the transmission. Each of these hysteresis bands are large enough between each position in order to provide from the driver's point of view a selector close to a conventional automatic selector lever and avoid any premature wearing of the system. It has been found that the selector 17 might be left to an intermediate position within one of these hysteresis bands, as shown in FIG. 2, causing the risk that the selector 17 might be unintentionally moved from a non drive position, i.e. Park position or Neutral position, to a drive position, i.e. Reverse position or Drive position by a subsequent vibration, shock or even unintentionally by a person and thus shifting the transmission in one of this driving position.

To overcome this problem, the position sensor 18 of the selector system 12 is adapted to detect the selector 17 in any hysteresis band I1, I2, I3 and I4 and send a control signal to the ETS 20 so as to control a warning device and the transmission 11 according to a control strategy explained in detail below. In this example the warning device forms part of the illuminated labels (P, R, N, D, S) 19.

Figure 3:
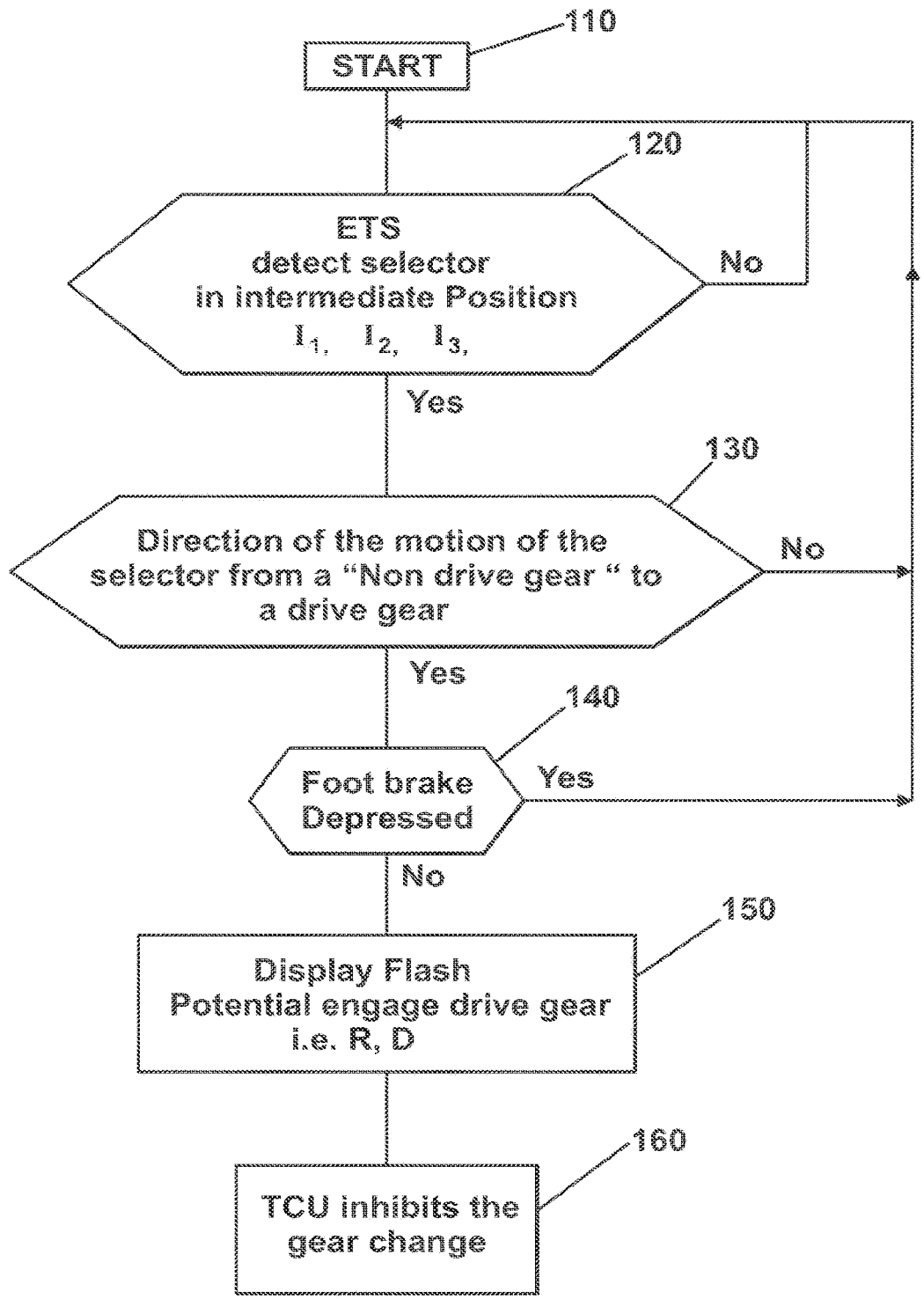
FIG. 3 is a flow chart showing a method of operating the shift-by-wire system and the transmission shown in FIG. 1 when the selector is detected in an intermediate position.

FIG. 3 illustrates a flow diagram of the control strategy of the selector system 12. The control routine starts at 110, in which the position sensor monitored the position of the selector 17. An inquiry is made at step 120 to determine whether the selector 17 has been detected in one of the intermediate position I1, I2 or I3 as shown in FIG. 2. If yes, an inquiry is made at step 130 as to whether the direction of the motion of the selector 17 from a "Non drive gear position", i.e. P or N, to a "drive gear position", i.e. R or D. If yes, a third inquiry is made at step 140 to determine whether the foot brake 15 is depressed.

A positive answer to this later inquiry will transmit a command to the display 23 to flash the label of the potential engage drive gear (R or D) to warn the driver that the selector 17 is in balance position and that the vehicle cannot be safely left, at step 150. In an alternative a command to vibrate the selector 17 through a vibration device (not shown) associated to the selector 17 is also sent forming hence a combination of a luminous warning with a vibration warning. However, other warning devices are possible such as a command of a sound or vibration within the driver's seat so that expressions which indicate a warning device are used for convenience only.

It is also sent a command through the TCU 20 to inhibit any gear change of the transmission 11 and maintaining the current selected non drive mode of the transmission 11 until the selector 17 is moved towards a nominal position, at step 160. On the contrary a positive answer at step 140 and a negative answer at each step 120 and step 130, will move the routine back to step 110.

Figure 3A:
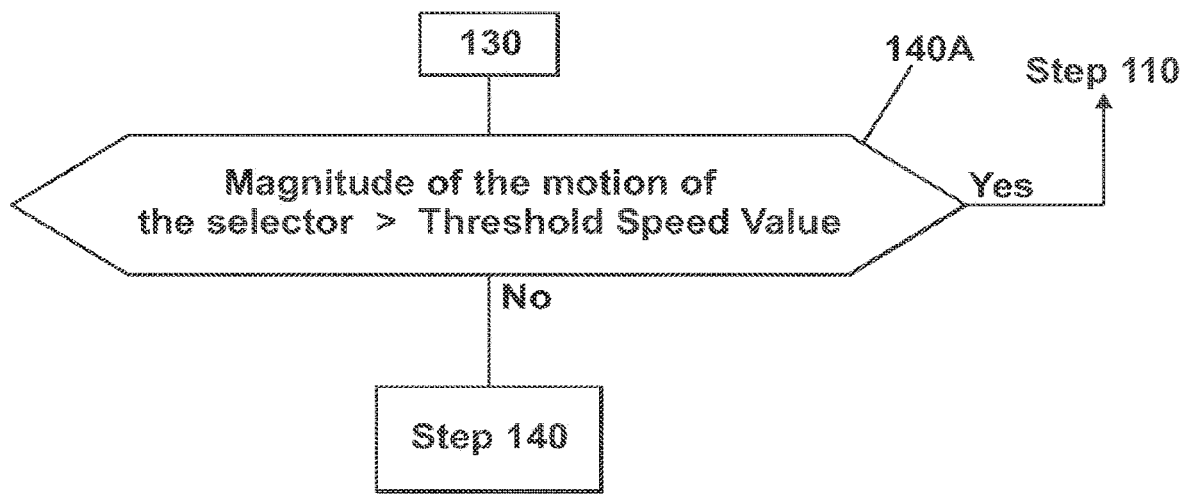
FIG. 3a shows a modification of the flow chart of FIG. 3.

In a modification shown in FIG. 3a, the control strategy includes between the steps 130 and 140, an inquiry at step 140A so as to determine whether the magnitude of the motion of the selector 17 monitored by the position sensor 18 is above a predetermined threshold speed value. A negative answer to this inquiry will shift the strategy at step 140. This inquiry prevents any command from being sent to the warning device such as a command to flash the display or a vibration so as to avoid any distraction and inconvenience for the driver every time the driver operates the selector 17. In other words, this inquiry enables to inhibit the warning strategy for the intermediate positions I1, I2 and I3 of the selector 17.

Figure 3B:
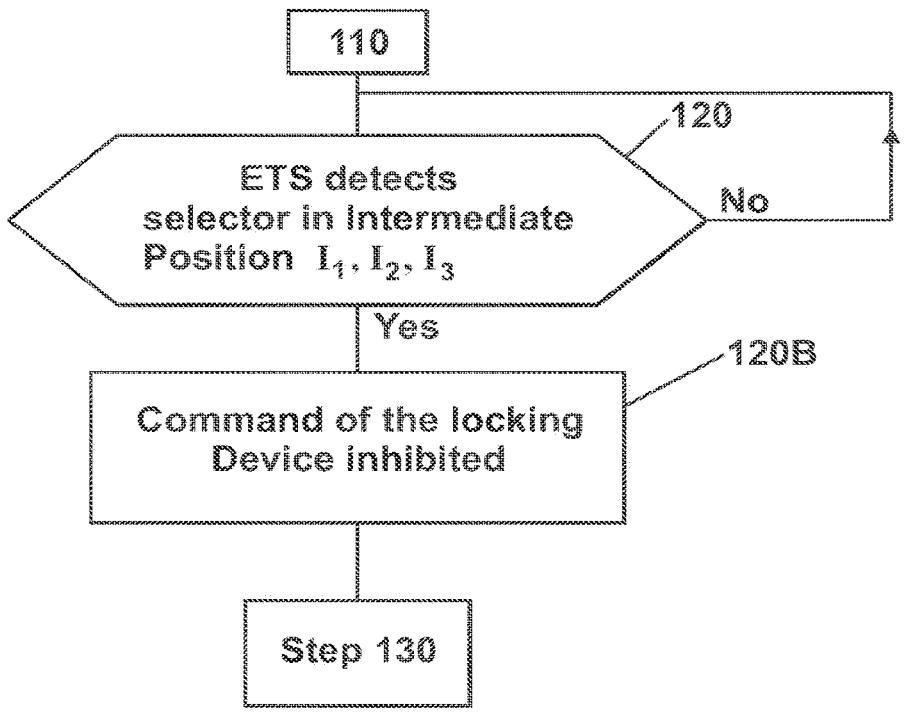
FIG. 3b shows a second modification to the flow chart of FIG. 3.

In another modification shown in FIG. 3b, if the control strategy determines that the selector is monitored in the intermediate position I1, I2 or I3, at step 120, then the control signal to command the locking device of the selector in its Park position and Neutral position is inhibited, at step 120B, even if the brake pedal is not depressed. This step 130 avoids that the engagement of the locking device displaces the selector towards the inappropriate gear position and also to avoid wearing of the lock device and possibly the detent plate as the lock device cannot be engaged in its lock position when the detent plate is in intermediate position. However, even if the selector is not mechanically locked, the control strategy ensures at step 160 that the TCU will lock any command to shift the transmission unless the brake pedal is depressed and the selector monitored in a new nominal position.

The method as described herein has the advantages of offering a multi-stable shift-by-wire selector which ensures that the driver is aware that the selector has been left in a balance position and that necessary action is requested from the driver in order to leave the vehicle in a safe condition. In the event no action is taken by the driver the transmission is shifted to a lock mode in which no drive gear position can be shifted. Although the description has been made in relation to a rotary selector it will be appreciated that the selector could be replaced by a multi-stable shift-by-wire lever.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A control system for a motor vehicle shift-by-wire transmission, the transmission having a number of operating modes including at least one drive mode and at least one non-drive mode, the system comprising:
   a multi-stable rotary selector which is operable by a driver of the vehicle to select a respective one of the operating modes of the transmission;
   wherein the system is configured to determine whether the rotary selector has been moved from a non-drive mode to a drive mode in dependence on the output of a position sensor arranged to measure the angular position of the rotary selector; and
   when the rotary selector is determined to have been moved from a non-drive mode to a drive mode through an intermediate position at which it has been determined that a brake pedal of the vehicle was not depressed, to maintain a current operating mode of the transmission.

2. The system of claim 1, wherein the system is configured, when the rotary selector is determined to have been moved from a non-drive mode position to a drive mode position through an intermediate position at which the brake pedal was not depressed, to maintain the current operating mode of the transmission and inhibit any change of operating mode until the rotary selector is detected in a new position.

3. The system of claim 1, comprising a transmission control unit (TCU) which, in use, controls a ratio of the transmission.

4. The system of claim 3, comprising an electronic transmission selector (ETS) for sensing an operating mode position corresponding to a selected operating mode of the rotary selector and sending a command to the TCU to control the operating mode of the transmission in dependence thereon.

5. The system of claim 3, wherein the TCU is configured, when the rotary selector is determined to have been moved from a non-drive mode position to a drive mode position through an intermediate position at which the brake pedal was not depressed, not to shift the transmission unless the brake pedal is depressed and the selector is determined to be in a new position.

6. The system of claim 1, comprising a warning device, wherein the system is configured, when the rotary selector is determined to have been moved from a non-drive mode position to a drive mode position through an intermediate position at which the brake pedal was not depressed, to provide a warning signal to the warning device in order to inform the driver.

7. The system of claim 6, comprising an arrangement of illuminated labels indicating the operating mode of the transmission, wherein the warning device comprises part of the illuminated labels, and wherein the system is operable, when the rotary selector is determined to have been moved from a non-drive mode position to a drive mode position through an intermediate position at which the brake pedal was not depressed, to flash an illuminated label corresponding to the drive mode position to which the rotary selector has been moved.

8. The system of claim 1, wherein the multi-stable rotary selector comprises an indexing mechanism for maintaining an immobilisation of the rotary selector in one of a plurality of indexed positions corresponding to a respective operating mode of the transmission, the indexing mechanism comprising a detent plate having a plurality of notches, wherein the number of notches is equal to the number of operating modes of the transmission, each notch being associated with a respective one of the operating modes.

9. The system of claim 8, wherein the transmission has four operating modes being a Park mode, a Drive mode, a Neutral mode and a Reverse mode, wherein the indexing mechanism comprises a detent member coupled to the rotary selector and wherein the detent plate has four notches, the indexing mechanism being arranged such that rotation of the rotary selector causes the detent member to engage successively with the notches in the order of a Park mode position, a Reverse mode position, a Neutral mode position and a Drive mode position.

10. The system of claim 8, wherein the transmission has five operating modes being a Park mode, a Drive mode, a Neutral mode, a Reverse mode and a Sport mode, wherein the indexing mechanism comprises a detent member coupled to the rotary selector and wherein the detent plate has five notches, the indexing mechanism being arranged such that rotation of the rotary selector causes the detent member to engage successively with the notches in the order of a Park mode position, a Reverse mode position, a Neutral mode position, a Drive mode position and a Sport mode position.

11. A vehicle comprising the control system according to claim 1.

12. A control system for a motor vehicle shift-by-wire transmission, the transmission having a number of operating modes including at least one drive mode and at least one non-drive mode, the system comprising:
   a multi-stable rotary selector which is operable by a driver of the vehicle to select a respective one of the operating modes of the transmission; and
   a warning device;
   wherein the system is configured to determine whether the rotary selector has been moved from a non-drive mode position to a drive mode position in dependence on the output of a position sensor arranged to measure the angular position of the rotary selector; and when the rotary selector is determined to have been moved from a non-drive mode position to a drive mode position through an intermediate position at which it has been determined that a brake pedal of the vehicle was not depressed, to provide a warning signal to the warning device to inform the driver.

13. The system according to claim 12, wherein the system is configured, when the rotary selector is determined to have been moved from a non-drive mode position to a drive mode position through an intermediate position at which the brake pedal was not depressed, to maintain a current operating mode of the transmission.

14. The system according to claim 12, comprising an arrangement of illuminated labels indicating the operating mode of the transmission, wherein the warning device comprises part of the illuminated labels, and wherein the system is operable, when the rotary selector is determined to have been moved from a non-drive mode position to a drive mode position through an intermediate position at which the brake pedal was not depressed, to flash an illuminated label corresponding to the drive mode position to which the rotary selector has been moved.

15. The system of claim 12, wherein the multi-stable rotary selector comprises an indexing mechanism for maintaining an immobilisation of the rotary selector in one of a plurality of indexed positions corresponding to a respective operating mode of the transmission, the indexing mechanism comprising a detent plate having a plurality of notches, wherein the number of notches is equal to the number of operating modes of the transmission, each notch being associated with a respective one of the operating modes.

16. The system of claim 15, wherein the transmission has four operating modes being a Park mode, a Drive mode, a Neutral mode and a Reverse mode, wherein the indexing mechanism comprises a detent member coupled to the rotary selector and wherein the detent plate has four notches, the indexing mechanism being arranged such that rotation of the rotary selector causes the detent member to engage successively with the notches in the order of a Park mode position, a Reverse mode position, a Neutral mode position and a Drive mode position.

17. The system of claim 15, wherein the transmission has five operating modes being a Park mode, a Drive mode, a Neutral mode, a Reverse mode and a Sport mode, wherein the indexing mechanism comprises a detent member coupled to the rotary selector and wherein the detent plate has five notches, the indexing mechanism being arranged such that rotation of the rotary selector causes the detent member to engage successively with the notches in the order of a Park mode position, a Reverse mode position, a Neutral mode position, a Drive mode position and a Sport mode position.

18. The system of claim 12, comprising a transmission control unit (TCU) which, in use, controls a ratio of the transmission.

19. The system of claim 18, wherein the TCU is configured, when the rotary selector is determined to have been moved from a non-drive mode position to a drive mode position through an intermediate position at which the brake pedal was not depressed, not to shift the transmission unless the brake pedal is depressed and the selector is determined to be in a new position.

20. A vehicle comprising the control system according to claim 12.

* * * * *